(12) United States Patent
Yavuz et al.

(10) Patent No.: US 11,535,701 B2
(45) Date of Patent: Dec. 27, 2022

(54) SOLVENT-LINKED POROUS COVALENT ORGANIC POLYMERS AND METHOD OF PREPARING THE SAME

(71) Applicant: KOREA ADVANCED INSTITUTE OF SCIENCE AND TECHNOLOGY, Daejeon (KR)

(72) Inventors: Cafer T. Yavuz, Daejeon (KR); Vepa Rozyyev, Daejeon (KR); Joo Sung Lee, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 291 days.

(21) Appl. No.: 16/808,642

(22) Filed: Mar. 4, 2020

(65) Prior Publication Data
US 2020/0362094 A1    Nov. 19, 2020

(30) Foreign Application Priority Data
May 17, 2019 (KR) .................. 10-2019-0058296

(51) Int. Cl.
*C08G 61/02* (2006.01)
*B01J 20/26* (2006.01)
*B01J 20/28* (2006.01)

(52) U.S. Cl.
CPC ............ *C08G 61/02* (2013.01); *B01J 20/262* (2013.01); *B01J 20/28054* (2013.01);
(Continued)

(58) Field of Classification Search
CPC .... C08G 61/02; C08G 61/124; C08G 61/122; C08G 2261/148; C08G 2261/314; C08G 2261/3162; C08G 2261/45; C08G 2261/3241; C08G 2261/3321; B01J 20/226; B01J 20/28061; B01J 20/28066;
(Continued)

(56) References Cited

FOREIGN PATENT DOCUMENTS

WO    2016167725 A1    10/2016

OTHER PUBLICATIONS

Wood et al., Chem. Mater. 2007, 19, 2034-2048.*
(Continued)

*Primary Examiner* — Shane Fang
(74) *Attorney, Agent, or Firm* — Hultquist, PLLC; Steven J. Hultquist

(57) ABSTRACT

Solvent-linked porous covalent organic polymers (COPs) and a method of preparing the same are described. The porous covalent organic polymers are linked by a solvent and are thus suitable for the transportation and storage of natural gas. A method of preparing the porous covalent organic polymers by conducting alkylation polymerization between an aromatic monomer and a chlorine-based solvent in the presence of a Lewis acid catalyst is described. Porous stretchable covalent organic polymers having pores with various sizes can be synthesized simply and quickly at room temperature and atmospheric pressure without a heating or purification step. The covalent organic polymers have very high natural gas storage capacity due to the flexible porous network structure thereof and thus are suitable for storage and transportation of natural gas and useful as a natural gas adsorbent.

10 Claims, 8 Drawing Sheets
(6 of 8 Drawing Sheet(s) Filed in Color)

(52) U.S. Cl.
CPC . *C08G 2261/148* (2013.01); *C08G 2261/314* (2013.01); *C08G 2261/3162* (2013.01); *C08G 2261/45* (2013.01)

(58) Field of Classification Search
CPC .... B01J 20/28083; B01J 20/50; B01J 20/262; B01J 20/28054; B01J 20/305; C02F 1/285; C02F 2103/08; C02F 2103/16; C02F 2103/346
See application file for complete search history.

(56) References Cited

OTHER PUBLICATIONS

Rozyyev, V., "Solvent-Linked Covalent Organic Polymers for Gas Capture and Storage", "Master's Thesis—Graduate School of Energy, Environment, Water and Sustainability—Korea Advanced Institute of Science and Technology", 2018, pp. 1-81.

Wang, S., et al., "Layered Microporous Polymers by Solvent Knitting Method", "Sci. Adv.", Mar. 31, 2017, pp. 1-9, vol. 3, No. e1602610.

Luo, Y., et al., "Microporous organic polymers synthesized by self-condensation of aromatic hydroxymethyl monomerst", Polymer Chemistry, 2012, Page(s) DOI:10.1039/c2py20914d, Publisher: RSC Publishing.

Ben, T., et al., "Gas Storage in Porous Aromatic Frameworks (PAFs)", "Energy and Environmental Science", 2011, pp. 3991-3999, vol. 4.

Cui, Y., et al., "Benzimidazole-Linked Porous Polymers: Synthesis and Gas Sorption Properties", "Chin. J. Chem.", 2014, pp. 1-6.

Furukawa, H., et al., "Storage of Hydrogen, Methane, and Carbon Dioxide in Highly Porous Covalent Organic Frameworks for Clean Energy Applications", "J. Am. Chem. Soc.", 2009, pp. 8875-8883, vol. 131.

Goworek, J., et al., "Absorption / Adsorption Properties of Porous Phenolic-Formaldehyde and Melamine-Formaldehyde Polymers", "Materials Chemistry and Physics", 2002, pp. 276-280, vol. 77.

Guo, Z., et al., "A Metal-Organic Framework With Optimized Open Metal Sites and Pore Spaces for High Methane Storage at Room Temperature", "Angew. Chem. Int. Ed.", 2011, pp. 3178-3181.

Lee, J.Y., et al., "Hydrogen Adsorption in Microporous Hypercrosslinked Polymers", "Chem. Commun.", 2006, pp. 2670-2672.

Li, L., et al., "Construction of Sole Benzene Ring Porous Aromatic Frameworks and Their High Adsorption Properties", "Applied Materials and Interfaces", 2014, pp. A-H.

Liu, G., et al., "A Facile Synthesis of Microporous Organic Polymers for Efficient Gas Storage and Separation", "J. Mater. Chem. A.", 2013, pp. 1-9.

Lu, W., et al., "Porous Polymer Networks: Synthesis, Porosity, and Applications in Gas Storage/Separation", "Chem. Mater.", 2010, pp. 5964-5972, vol. 22.

Ma, S., et al., "Gas Storage in Porous Metal-Organic Frameworks for Clean Energy Applications", "Chem. Commun.", 2010, pp. 44-53, vol. 45.

Mason, J., et al., "Methane Storage in Flexible Metal-Organic Frameworks with Intrinsic Thermal Management", "Nature", 2015, pp. 1-15.

Rabbani, M., et al., "Synthesis and Characterization of Porous Benzimidazole-Linked Polymers and Their Performance in Small Gas Storage and Selective Uptake", "Chemistry of Materials", 2012, pp. 1511-1517, vol. 24.

\* cited by examiner (1) Benzene
(2) Toluene
(3) Xylene
(4) Mesitylene
(5) Phenol
(6) Aniline
(7) Pyridine
(8) 1,2-dichlorobenzene
(9) Triphenylamine
(10) Triphenylphosphine
(11) Naphthalene
(12) Biphenyl
(13) Triphenylmethane
(14) Tetraphenylmethane
(15) Tetraphenyladamantane
(16) Aluminium chloride (anhydrous)
(17) Dichloromethane
(18) Chloroform
(19) 1,2-dichloroethane

SOLVENT-LINKED POROUS COVALENT ORGANIC POLYMERS AND METHOD OF PREPARING THE SAME

CROSS-REFERENCE TO RELATED APPLICATION

The priority under 35 USC §119 of Korean Patent Application 10-2019-0058296 filed May 17, 2019 is hereby claimed. The disclosure of Korean Patent Application 10-2019-0058296 is incorporated herein by reference, in its entirety, for all purposes.

TECHNICAL FIELD

The present invention relates to solvent-linked porous covalent organic polymers (COPS) and a method of preparing the same, and more particularly to porous covalent organic polymers that are linked by a solvent and are thus suitable for the transportation and storage of natural gas and a method of preparing the porous covalent organic polymers by conducting alkylation polymerization using an aromatic monomer and a chlorinated solvent in the presence of a Lewis acid catalyst.

BACKGROUND ART

An increase in the concentration of carbon dioxide in the atmosphere has brought about the problem of global warming, and depletion of petroleum reserves has created the need for more environmentally friendly and plentiful energy resources than petroleum. In addition, the field of vehicles accounts for a major proportion of petroleum consumption, specifically about 50% thereof. Recently, the increased use of vehicles has caused more severe air pollution. Thus, there is drastically increasing interest in natural resources as energy resources to solve this problem and replace petroleum, the supply of which is limited.

Natural gas is cleaner than petroleum from environmental aspects (low $CO_2$ emissions, low $NO_x$ and toxic carcinogens). In addition, natural gas is obtained in a total amount of approximately 368 trillion cubic meters from all deposits of natural gas hydrates found all over the world, and is thus an abundant energy resource.

However, natural gas with a low density cannot be utilized in various applications and places due to difficulty in transportation and storage thereof. Natural gas is mainly composed of about 95% of methane gas and a higher alkane such as ethane or propane with the residual amount of CO2. In atmospheric conditions, methane (the main ingredient of natural gas) has a very low density (0.656 g/L at 25° C. and 1 atm).

Conventionally, two methods have been used for the storage and transportation of natural gas: compressed natural gas (CNG) and liquefied natural gas (LNG). Compressed natural gas is stored in high-pressure tanks (at maximum of 300 bar) at room temperature, while liquefied natural gas is liquefied at a low temperature (−162° C.) at atmospheric pressure.

The use of compressed natural gas creates safety problems due to the very high pressure thereof, about 300 bar, thus being applicable to vehicles. Even when compressed natural gas is used in a high-pressure gaseous state, it can still only be stored at a density one-fourth that of petroleum in a tank of a given volume. In addition, high-pressure tanks require heavy and expensive materials with specific designs (spherical and cylindrical), making them much more difficult to be incorporated in systems inside vehicles.

Liquefied natural gas can be stored at an energy density 2.5 times higher than compressed natural gas. However, only 65% of the energy of gasoline can be stored in a tank of the same volume. Despite the high energy density of liquefied natural gas, heavy, large and expensive insulating materials are required for storage and transportation. In addition, it is difficult to maintain low temperatures even in cryogenic conditions because a large amount of energy is required to liquefy natural gas and heat loss constantly occurs. Therefore, development of novel methods capable of solving the problems of compressed natural gas and liquefied natural gas is underway.

In adsorbed natural gas (ANG) systems, porous adsorbents can be used to store natural gas at lower pressures than compressed natural gas and at higher temperatures than liquefied natural gas. Compared with compressed natural gas, adsorbed natural gas systems can store natural gas in a safe (low pressure), inexpensive (low pressure loading) and lighter (thinner tank) manner. The shape of compressed natural gas tanks is limited to spherical and cylindrical shapes, but a greater variety of shapes of tanks may be used for adsorbed natural gas.

The United States Department of Energy (DOE) has set standards (targets) for compressed natural gas system at 250 bar including a gravimetric working capacity of 0.5 g/g and a volumetric working capacity of 263 $cm^3/cm^3$ for adsorbed natural gas adsorbents.

Considering materials for methane storage applications, high pressures are required, and high-pressure flexible non-porous or low-porous materials can become highly porous at high pressures and thus adsorb large quantities of gas. The materials do not necessarily have to be porous under atmospheric conditions. It is even preferable for the material to be non-porous at atmospheric conditions or at pressures up to 5 bar since gases adsorbed below 5 bar cannot be transported.

Covalent organic polymers (COPs), having a network structure, may be used as adsorbents for high-pressure storage of natural gas. The reason for this is that natural gas can be adsorbed on the pore surface of the network polymer at high density. Covalent organic polymers can be synthesized in a low-cost manner because they require inexpensive petroleum-based organic chemicals. In addition, organic polymer materials have a lower density than conventional inorganic or organic-inorganic materials (Ma, S. et al., Chemical Communications 46, 44-53; Furukawa, H. et al., Journal of the American Chemical Society 131, 8875-8883;

Lee, J.-Y. et al., Chemical Communications, 2670-2672; Jiang, Lu, W. et al. Chemistry of Materials 22, 5964-5972; Rabbani, M. G. et al., Chemistry of Materials 24, 1511-1517; Cui, Y. et al., Chinese Journal of Chemistry 33, 131-136; Goworek, J. et al., Materials Chemistry and Physics 77, 276-280; Mason, J. A. et al. Nature 527, 357-361; Guo, Z. et al. Angewandte Chemie International Edition 50, 3178-3181, Liu, G. et al., Journal of Materials Chemistry A 3, 3051-3058; Li, L. et al., ACS Applied Materials & Interfaces 7, 201-208; Ben, T. et al. Energy & Environmental Science 4, 3991-3999).

Accordingly, as a result of intensive efforts to develop covalent organic polymers suitable for the transportation and storage of natural gas, the present inventors have found that porous stretchable covalent organic polymers having pores with various sizes can be synthesized simply and quickly at room temperature and atmospheric pressure without a heating or purification step by conducting Friedel-Crafts alkylation polymerization using an aromatic monomer and an excess of chlorinated solvent in the presence of a Lewis acid catalyst, and that the covalent organic polymers have very high natural gas storage capacity due to the flexible porous network structure thereof and are thus useful as a natural gas adsorbent, thus completing the present invention.

SUMMARY OF THE INVENTION

Therefore, the present invention has been made in view of the above problems, and it is an object of the present invention to provide a porous covalent organic polymer that has high natural gas storage capacity due to the flexible porous network structure thereof and is thus suitable for transportation and storage of natural gas, and a natural gas adsorbent including the same.

It is another object of the present invention to provide a method of preparing the porous covalent organic polymer in a simple and inexpensive manner at room temperature and atmospheric pressure without a heating or purification step.

In accordance with an aspect of the present invention, the above and other objects can be accomplished by the provision of a porous covalent organic polymer represented by the following Formula 1, 2 or 3:

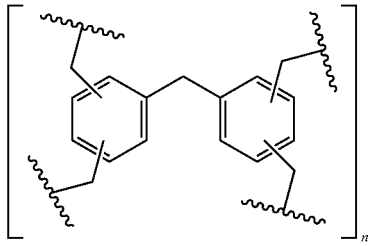

[Formula 1]

wherein n is an integer of 10 to 100,000;

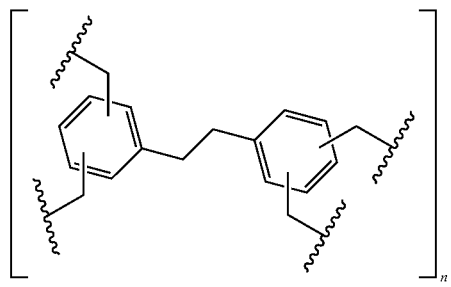

[Formula 2]

wherein n is an integer of 10 to 100,000; and

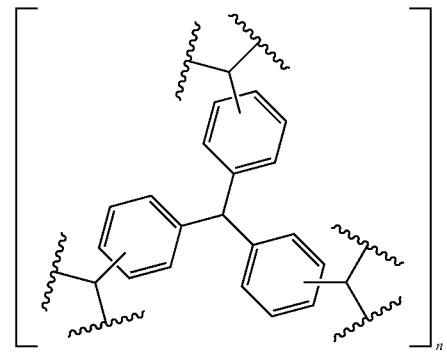

[Formula 3]

wherein n is an integer of 10 to 100,000.

In accordance with another aspect of the present invention, there is provided a method of preparing a porous covalent organic polymer including conducting a Friedel-Crafts alkylation polymerization reaction using an aromatic monomer and a chlorinated solvent in the presence of a Lewis acid catalyst to prepare a porous covalent organic polymer represented by the following Formula 1, 2 or 3:

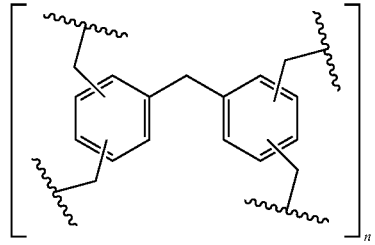

[Formula 1]

wherein n is an integer of 10 to 100,000;

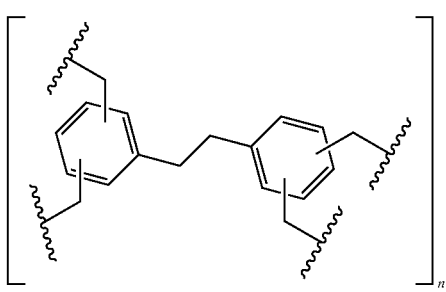

[Formula 2]

wherein n is an integer of 10 to 100,000; and

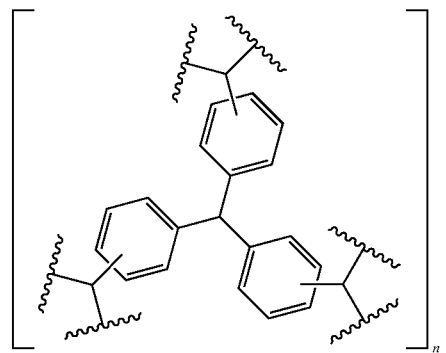

[Formula 3]

wherein n is an integer of 10 to 100,000.

In accordance with another aspect of the present invention, there is provided a natural gas adsorbent including the porous covalent organic polymer.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other objects, features and other advantages of the present invention will be more clearly understood from the following detailed description taken in conjunction with the accompanying drawings, in which.

BEST MODE FOR CARRYING OUT THE INVENTION

Figure 1:
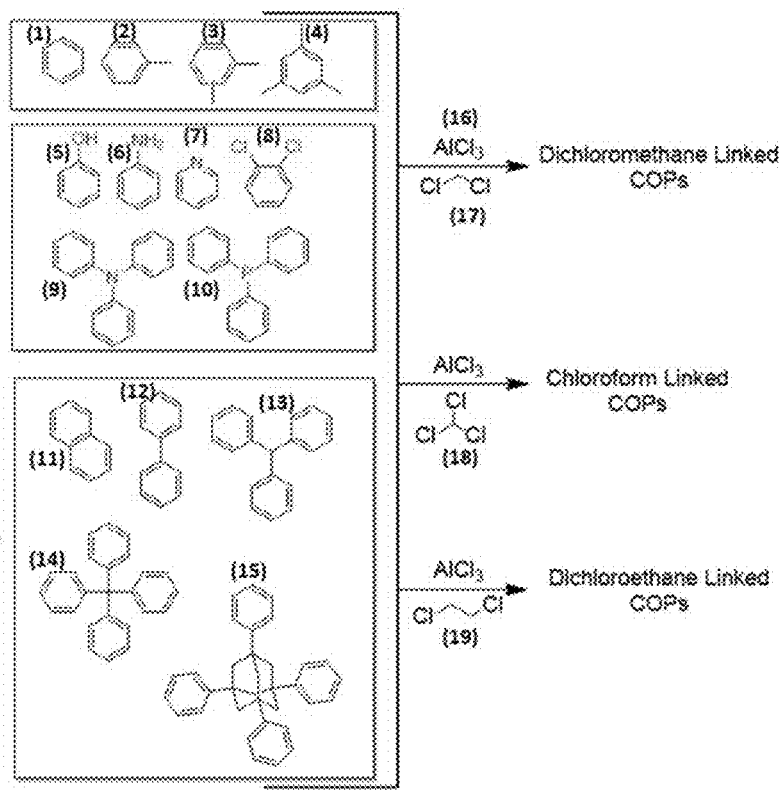
FIG. 1 is a schematic diagram showing a process of forming a polymer having a network structure through an alkylation reaction between an aromatic monomer and an excess of chlorinated solvent in the presence of a Lewis acid catalyst.

Unless defined otherwise, all technical and scientific terms used herein have the same meanings as appreciated by those skilled in the field to which the present invention pertains. In general, the nomenclature used herein is well-known in the art and is ordinarily used.

In the present invention, the covalent organic polymer having a solvent as a linker, which is synthesized through Friedel-Crafts alkylation polymerization using an aromatic monomer and an excess of a chlorinated solvent in the presence of a Lewis acid catalyst such as aluminum chloride ($AlCl_3$), has a high storage capacity due to the flexible porous network structure thereof, and is thus considered suitable for the transportation and storage of natural gas, and can be prepared in a simple and fast manner since it requires neither heating nor purification steps at room temperature and atmospheric pressure, and facilitates reduced production costs and industrial mass production since readily available and inexpensive raw materials are used for the preparation thereof.

Therefore, in one aspect, the present invention is directed to a porous covalent organic polymer represented by the following Formula 1, 2 or 3:

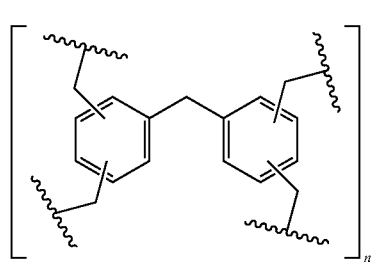

[Formula 1]

wherein n is an integer of 10 to 100,000;

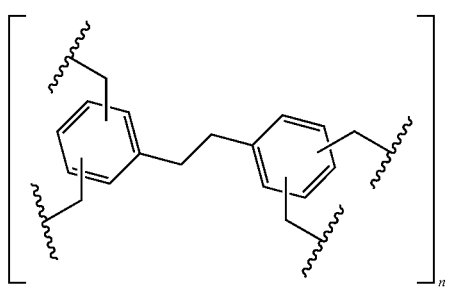

[Formula 2]

wherein n is an integer of 10 to 100,000; and

[Formula 3]

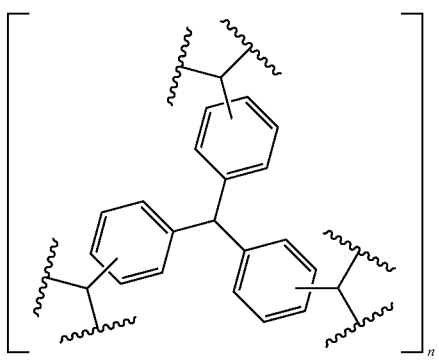

wherein n is an integer of 10 to 100,000.

In Formula 1, the repeating unit of Formula 1 is bonded to each

to produce a polymer having a number of repeating units of 10 to 100,000.

In Formula 2, the repeating unit of Formula 2 is bonded to each

to produce a polymer having a number of repeating units of 10 to 100,000.

In Formula 3, the repeating unit of Formula 3 is bonded to each

to produce a polymer having a number of repeating units of 10 to 100,000.

Therefore, in another aspect, the present invention is directed to a method of preparing a porous covalent organic polymer including conducting a Friedel-Crafts alkylation polymerization reaction using an aromatic monomer and a chlorinated solvent in the presence of a Lewis acid catalyst to prepare the porous covalent organic polymer represented by Formula 1, 2 or 3.

In the present invention, the porous covalent organic polymer may have a specific surface area of 10 to 2,500 m$^2$/g, preferably 15 to 1,700 m$^2$/g.

In the present invention, the porous covalent organic polymer may be present as a combination of microporous, mesoporous and macroporous structures.

In the preparation method of the present invention, the chlorinated solvent may be added in an amount of 500 to 20,000 parts by weight with respect to 100 parts by weight of the aromatic monomer.

Within the above content range of the chlorinated solvent, there is an effect in which the solvent-linked polymer is formed.

The Lewis acid catalyst may be aluminum chloride (AlCl$_3$), but any substance may be used without limitation as long as it can serve as a Lewis acid catalyst causing the Friedel-Crafts alkylation reaction between the aromatic monomer and the chlorinated solvent.

In the present invention, the Lewis acid catalyst may include one or more selected from the group consisting of aromatic benzene, toluene, xylene, mesitylene, phenol, aniline, pyridine, 1,2-dichlorobenzene, triphenylamine, triphenylphosphine, naphthalene, biphenyl, triphenylmethane, tetraphenylmethane, tetraphenyladamantane, diphenyl ether, triphenylbenzene, triphenylmethane and diphenylamine, but is not limited thereto.

In the present invention, the chlorinated solvent may be dichloromethane, chloroform or 1,2-dichloroethane, but is not limited thereto. In the present invention, the excess of chlorinated solvent can serve as both a linker for linking the aromatic monomers, and a solvent. The excess linker formed a network structure, and a highly reactive intermediate formed by the reaction between the aromatic monomer and the chlorinated solvent provides a higher-molecular-weight network polymer than a multi-substituted aromatic compound through self-polymerization.

According to a specific embodiment of the present invention, organic compounds that can be used as aromatic monomers (1-15), chlorinated solvents (17-19) and Lewis acid catalysts (16) used to synthesize the covalent organic polymer are shown in FIG. 1, but are not limited thereto.

The reaction scheme of the covalent organic polymer according to a specific embodiment of the present invention is as follows. The porous covalent organic polymer has a network structure and is formed through self-polymerization of highly reactive intermediates.

[Reaction Scheme 1]

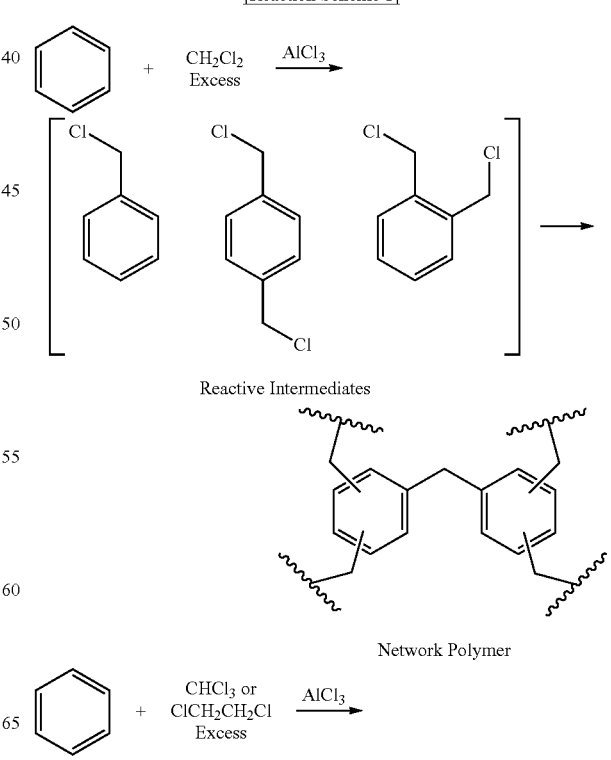

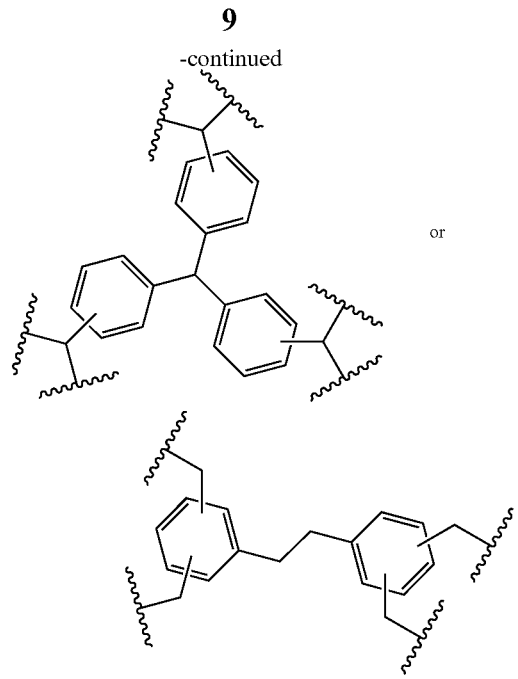

In the present invention, the reaction may be carried out in the presence of inert gas at −25 to 125° C. for 24 to 72 hours.

In the present invention, the reaction may be one-pot polymerization. In the present invention, the term "one-pot polymerization" refers to a synthetic operation in which, when a target compound is synthesized through a reaction process including two or more steps, addition and reaction of reactants in a subsequent step are successively conducted in a single reactor, thereby obtaining the target compound without isolating or purifying the product (intermediate product) obtained during each step in the reaction process. In general, this method is capable of avoiding substance loss due to isolation and purification of the intermediate product and thus providing improved overall yield compared to a method including isolating and purifying each intermediate and then conducting a subsequent step, as long as the byproducts do not interfere with the reaction of the subsequent step.

The present invention identified that the porous covalent organic polymer has pores with various sizes, elasticity and much higher storage capacity than the target set by the US Department of Energy (DOE), and the flexible porous network structure of the polymer is thus ideal for use in ANG systems.

In another aspect, the present invention is directed to a natural gas adsorbent including the porous covalent organic polymer.

In the present invention, the prepared covalent organic polymer exhibits an ultra-high surface area which can have a nonporous structure or a highly porous structure, and a BET surface area in the range from 10 to 2,500 $m^2/g$ which can have a combination of microporous, mesoporous and macroporous structures.

Materials having adsorption capability at pressures of 5 bar or less cannot be used in ANG technologies. The flexible porous network structure is low porous or non-porous at low pressures, but is highly porous and has high adsorption capacity at high pressures. Unlike rigid porous materials, the flexible polymer according to the present invention is highly reusable.

In a specific embodiment of the present invention, in order to analyze the ranges of the specific surface areas of the synthesized COPs 124 to 152, the Brunauer-Emett-Teller (BET) surface area was measured. The result showed that the BET surface area has a wide range from 2.5 to 1,655 $m^2/g$ (Table 1).

TABLE 1

| Monomer | Solvent | | |
| --- | --- | --- | --- |
| | DCM | CHCl$_3$ | DCE |
| Benzene | COP-124 30 $m^2/g$ | COP-131 | COP-150 120 $m^2/g$ |
| Toluene | | COP-132 | COP-144 |
| Xylene (mixture) | | COP-133 | |
| Diphenyl ether | | COP-139 | |
| Diphenyl amine | | COP-141 | COP-151 |
| Triphenylamine | | COP-142 632 $m^2/g$ | |
| 1,2-dichlorobenzene | | COP-143 | |
| Naphthalene | COP-127 17 $m^2/g$ | COP-134 724 $m^2/g$ | COP-145 |
| Biphenyl | COP-128 30 $m^2/g$ | COP-135 710 $m^2/g$ | COP-146 |
| Triphenylmethane | COP-125 75.5 $m^2/g$ | COP-136 | COP-147 |
| Tetraphenylmethane | COP-126 48 $m^2/g$ | COP-137 | COP-148 2.5 $m^2/g$ |
| Tetraphenyladamantane | COP-129 531 $m^2/g$ | COP-138 408 $m^2/g$ | COP-152 523 $m^2/g$ |
| 1,3,5-Triphenylbenzene | COP-130 1665 $m^2/g$ | COP-140 1216 $m^2/g$ | COP-149 479 $m^2/g$ |

Figure 6:
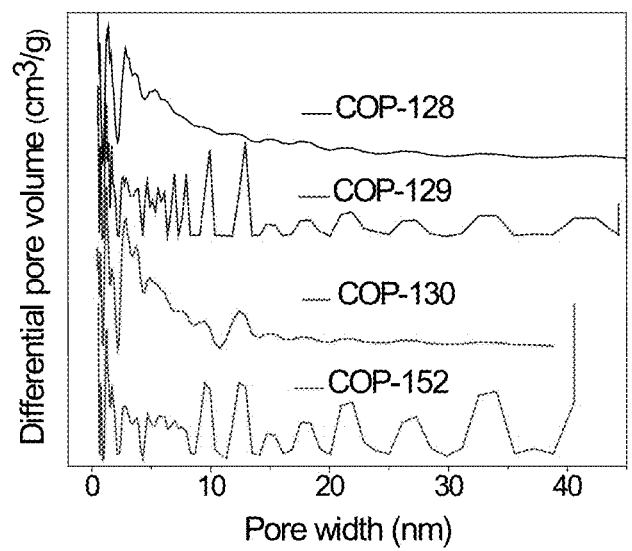
FIG. 6 shows pore size distributions of covalent organic polymers (COP 128-130 and 152) linked by dichloromethane and 1,2-dichloroethane.
Figure 7:
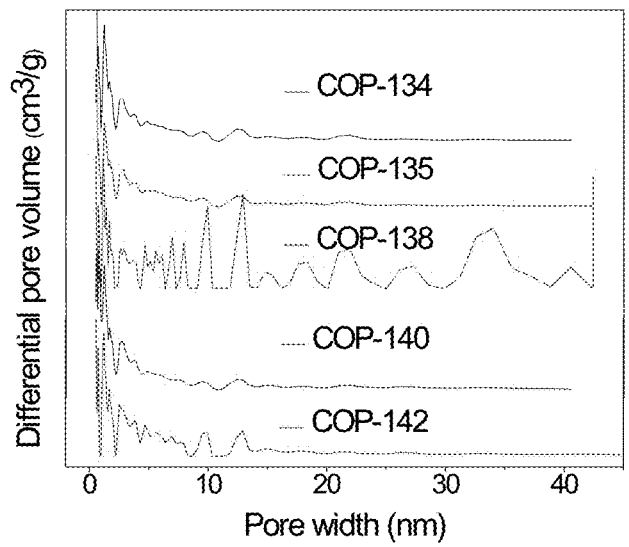
FIG. 7 shows a pore size distribution of a covalent organic polymer (COP 134-142) linked by chloroform.

In a specific embodiment of the present invention, the result of analysis of the pore size distribution of the synthesized COPs 124 to 152 showed that the pore size was variously distributed in a wide range of 0 to 40 nm (FIGS. 6 and 7).

Hereinafter, the present invention will be described in more detail with reference to examples. However, it will be obvious to those skilled in the art that these examples are provided only for illustration of the present invention and should not be construed as limiting the scope of the present invention.

EXAMPLE

Synthesis Example 1

Synthesis of COP-124

3.0 g of AlCl$_3$ and a magnetic stirring bar were added to a 30 mL glass vial, and the glass vial was then tightly sealed with a rubber septa. In order to maintain an inert medium, N$_2$ gas was made to flow into the vial. 1 ml of a benzene solution in 20 ml of dichloromethane was injected into the vial, and the resulting mixture was stirred for 48 hours in an N$_2$ atmosphere (note: HCl may increase the vial pressure). After 48 hours, methanol was slowly added to quench the reaction mixture (note: the reaction between AlCl$_3$ and methanol is highly exothermic), the solids were filtered, the residue was washed with methanol and chloroform (10 mL each) and extracted with a mixture of 100 ml of chloroform and 100 ml of methanol using a Soxhlet extractor for 24 hours. After washing, the product was dried in a vacuum at 120° C. for 12 hours.

Synthesis Example 2

Synthesis of COP-125

1.64 g of $AlCl_3$, 1.00 g of triphenylmethane and a magnetic stirring bar were added to a 30 mL glass vial, and the glass vial was then tightly sealed with a rubber septa. In order to maintain an inert medium, $N_2$ gas was made to flow into the vial. 20 ml of dried dichloromethane was injected into the vial and the resulting mixture was stirred for 48 hours in an $N_2$ atmosphere (note: HCl may increase the vial pressure). After 48 hours, methanol was slowly added to quench the reaction mixture (note: the reaction between $AlCl_3$ and methanol is highly exothermic), the solids were filtered, the residue was washed with methanol and chloroform (10 mL each) and extracted with a mixture of 100 ml of chloroform and 100 ml of methanol using a Soxhlet extractor for 24 hours. After washing, the product was dried in a vacuum at 120° C. for 12 hours.

Synthesis Example 3

Synthesis of COP-126

0.84 g of $AlCl_3$, 0.50 g of triphenylmethane and a magnetic stirring bar were added to a 30 mL glass vial and the glass vial was then tightly sealed with a rubber septa. In order to maintain an inert medium, $N_2$ gas was made to flow into the vial. 10 ml of dried dichloromethane was injected into the vial and the resulting mixture was stirred for 48 hours in an $N_2$ atmosphere (note: HCl may increase the vial pressure). After 48 hours, methanol was slowly added to quench the reaction mixture (note: the reaction between $AlCl_3$ and methanol is highly exothermic), the solids were filtered, and the residue was washed with methanol and chloroform (10 mL each) and extracted with a mixture of 100 ml of chloroform and 100 ml of methanol using a Soxhlet extractor for 24 hours. After washing, the product was dried in a vacuum at 120° C. for 12 hours.

Synthesis Example 4

Synthesis of COP-127

3.12 g of $AlCl_3$, 1.00 g of naphthalene and a magnetic stirring bar were added to a 30 mL glass vial, and the glass vial was then tightly sealed with a rubber septa. In order to maintain an inert medium, $N_2$ gas was made to flow into the vial. 20 ml of dried dichloromethane was injected into the vial and the resulting mixture was stirred for 48 hours in an $N_2$ atmosphere (note: HCl may increase the vial pressure). After 48 hours, methanol was slowly added to quench the reaction mixture (note: the reaction between $AlCl_3$ and methanol is highly exothermic), the solids were filtered, and the residue was washed with methanol and chloroform (10 mL each) and extracted with a mixture of 100 ml of chloroform and 100 ml of methanol using a Soxhlet extractor for 24 hours. After washing, the product was dried in a vacuum at 120° C. for 12 hours.

Synthesis Example 5

Synthesis of COP-128

2.60 g of $AlCl_3$, 1.00 g of biphenyl and a magnetic stirring bar were added to a 30 mL glass vial and the glass vial was then tightly sealed with a rubber septa. In order to maintain an inert medium, $N_2$ gas was made to flow into the vial. 20 ml of dried dichloromethane was injected into the vial and the resulting mixture was stirred for 48 hours in an $N_2$ atmosphere (note: HCl may increase the vial pressure). After 48 hours, methanol was slowly added to quench the reaction mixture (note: the reaction between $AlCl_3$ and methanol is highly exothermic), the solids were filtered, and the residue was washed with methanol and chloroform (10 mL each) and extracted with a mixture of 100 ml of chloroform and 100 ml of methanol using a Soxhlet extractor for 24 hours. After washing, the product was dried in a vacuum at 120° C. for 12 hours.

Synthesis Example 6

Synthesis of COP-129

0.60 g of $AlCl_3$, 0.50 g of tetraphenyladamantane and a magnetic stirring bar were added to a 30 mL glass vial and the glass vial was then tightly sealed with a rubber septa. In order to maintain an inert medium, $N_2$ gas was made to flow into the vial. 10 ml of dried dichloromethane was injected into the vial and the resulting mixture was stirred for 48 hours in an $N_2$ atmosphere (note: HCl may increase the vial pressure). After 48 hours, methanol was slowly added to quench the reaction mixture (note: the reaction between $AlCl_3$ and methanol is highly exothermic), the solids were filtered, and the residue was washed with methanol and chloroform (10 mL each) and extracted with a mixture of 100 ml of chloroform and 100 ml of methanol using a Soxhlet extractor for 24 hours. After washing, the product was dried in a vacuum at 120° C. for 12 hours.

Synthesis Example 7

Synthesis of COP-130

1.31 g of $AlCl_3$, 1.00 g of 1,3,5-triphenylbenzene and a magnetic stirring bar were added to a 30 mL glass vial and the glass vial was then tightly sealed with a rubber septa. In order to maintain an inert medium, $N_2$ gas was made to flow into the vial. 20 ml of dried dichloromethane was injected into the vial and the resulting mixture was stirred for 48 hours in an $N_2$ atmosphere (note: HCl may increase the vial pressure). After 48 hours, methanol was slowly added to quench the reaction mixture (note: the reaction between $AlCl_3$ and methanol is highly exothermic), the solids were filtered, and the residue was washed with methanol and chloroform (10 mL each) and extracted with a mixture of 100 ml of chloroform and 100 ml of methanol using a Soxhlet extractor for 24 hours. After washing, the product was dried in a vacuum at 120° C. for 12 hours.

Synthesis Example 8

Synthesis of COP-131

3.00 g of $AlCl_3$ and a magnetic stirring bar were added to a 30 mL glass vial, and the glass vial was then tightly sealed with a rubber septa. In order to maintain an inert medium, $N_2$ gas was made to flow into the vial. 1.00 mL of benzene and 20 mL of chloroform were injected into the vial and the resulting mixture was stirred for 48 hours in an $N_2$ atmosphere (note: HCl may increase the vial pressure). After 48 hours, methanol was slowly added to quench the reaction mixture (note: the reaction between $AlCl_3$ and methanol is highly exothermic), the solids were filtered, and the residue was washed with methanol and chloroform (10 mL each) and extracted with a mixture of 100 ml of chloroform and 100 ml of methanol using a Soxhlet extractor for 24 hours. After washing, the product was dried in a vacuum at 120° C. for 12 hours.

Synthesis Example 9

Synthesis of COP-132

2.52 g of $AlCl_3$ and a magnetic stirring bar were added to a 30 mL glass vial and the glass vial was then tightly sealed with a rubber septa. In order to maintain an inert medium, $N_2$ gas was made to flow into the vial. 1.00 mL of toluene and 20 mL of dried chloroform were injected into the vial, and the resulting mixture was stirred for 48 hours in an $N_2$ atmosphere (note: HCl may increase the vial pressure). After 48 hours, methanol was slowly added to quench the reaction mixture (note: the reaction between $AlCl_3$ and methanol is highly exothermic), the solids were filtered, and the residue was washed with methanol and chloroform (10 mL each) and extracted with a mixture of 100 ml of chloroform and 100 ml of methanol using a Soxhlet extractor for 24 hours. After washing, the product was dried in a vacuum at 120° C. for 12 hours.

Synthesis Example 10

Synthesis of COP-133

2.20 g of $AlCl_3$ and a magnetic stirring bar were added to a 30 mL glass vial, and the glass vial was then tightly sealed with a rubber septa. In order to maintain an inert medium, $N_2$ gas was made to flow into the vial. 1.00 mL of xylene and 20 mL of dried chloroform were injected into the vial, and the resulting mixture was stirred for 48 hours in an $N_2$ atmosphere (note: HCl may increase the vial pressure). After 48 hours, methanol was slowly added to quench the reaction mixture (note: the reaction between $AlCl_3$ and methanol is highly exothermic), the solids were filtered, and the residue was washed with methanol and chloroform (10 mL each) and extracted with a mixture of 100 ml of chloroform and 100 ml of methanol using a Soxhlet extractor for 24 hours. After washing, the product was dried in a vacuum at 120° C. for 12 hours.

Synthesis Example 11

Synthesis of COP-134

3.12 g of $AlCl_3$, 1.00 g of naphthalene and a magnetic stirring bar were added to a 30 mL glass vial and the glass vial was then tightly sealed with a rubber septa. In order to maintain an inert medium, $N_2$ gas was made to flow into the vial. 20 ml of dried chloroform was injected into the vial, and the resulting mixture was stirred for 48 hours in an $N_2$ atmosphere (note: HCl may increase the vial pressure). After 48 hours, methanol was slowly added to quench the reaction mixture (note: the reaction between $AlCl_3$ and methanol is highly exothermic), the solids were filtered, and the residue was washed with methanol and chloroform (10 mL each) and extracted with a mixture of 100 ml of chloroform and 100 ml of methanol using a Soxhlet extractor for 24 hours. After washing, the product was dried in a vacuum at 120° C. for 12 hours.

Synthesis Example 12

Synthesis of COP-135

2.60 g of $AlCl_3$, 1.00 g of biphenyl and a magnetic stirring bar were added to a 30 mL glass vial and the glass vial was then tightly sealed with a rubber septa. In order to maintain an inert medium, $N_2$ gas was made to flow into the vial. 20 ml of dried chloroform was injected into the vial, and the resulting mixture was stirred for 48 hours in an $N_2$ atmosphere (note: HCl may increase the vial pressure). After 48 hours, methanol was slowly added to quench the reaction mixture (note: the reaction between $AlCl_3$ and methanol is highly exothermic), the solids were filtered, and the residue was washed with methanol and chloroform (10 mL each) and extracted with a mixture of 100 ml of chloroform and 100 ml of methanol using a Soxhlet extractor for 24 hours. After washing, the product was dried in a vacuum at 120° C. for 12 hours.

Synthesis Example 13

Synthesis of COP-136

1.64 g of $AlCl_3$, 1.00 g of triphenylmethane and a magnetic stirring bar were added to a 30 mL glass vial and the glass vial was then tightly sealed with a rubber septa. In order to maintain an inert medium, $N_2$ gas was made to flow into the vial. 20 ml of dried chloroform was injected into the vial, and the resulting mixture was stirred for 48 hours in an $N_2$ atmosphere (note: HCl may increase the vial pressure). After 48 hours, methanol was slowly added to quench the reaction mixture (note: the reaction between $AlCl_3$ and methanol is highly exothermic), the solids were filtered, and the residue was washed with methanol and chloroform (10 mL each) and extracted with a mixture of 100 ml of chloroform and 100 ml of methanol using a Soxhlet extractor for 24 hours. After washing, the product was dried in a vacuum at 120° C. for 12 hours.

Synthesis Example 14

Synthesis of COP-137

0.84 g of $AlCl_3$, 0.50 g of tetraphenylmethane and a magnetic stirring bar were added to a 30 mL glass vial and the glass vial was then tightly sealed with a rubber septa. In order to maintain an inert medium, $N_2$ gas was made to flow into the vial. 10 ml of dried chloroform was injected into the vial and the resulting mixture was stirred for 48 hours in an $N_2$ atmosphere (note: HCl may increase the vial pressure). After 48 hours, methanol was slowly added to quench the reaction mixture (note: the reaction between $AlCl_3$ and methanol is highly exothermic), the solids were filtered, and the residue was washed with methanol and chloroform (10 mL each) and extracted with a mixture of 100 ml of chloroform and 100 ml of methanol using a Soxhlet extractor for 24 hours. After washing, the product was dried in a vacuum at 120° C. for 12 hours.

Synthesis Example 15

Synthesis of COP-138

0.60 g of $AlCl_3$, 0.50 g of tetraphenyladamantane and a magnetic stirring bar were added to a 30 mL glass vial and the glass vial was then tightly sealed with a rubber septa. In order to maintain an inert medium, N$_2$ gas was made to flow into the vial. 10 ml of dried chloroform was injected into the vial and the resulting mixture was stirred for 48 hours in an N$_2$ atmosphere (note: HCl may increase the vial pressure). After 48 hours, methanol was slowly added to quench the reaction mixture (note: the reaction between AlCl$_3$ and methanol is highly exothermic), the solids were filtered, and the residue was washed with methanol and chloroform (10 mL each) and extracted with a mixture of 100 ml of chloroform and 100 ml of methanol using a Soxhlet extractor for 24 hours. After washing, the product was dried in a vacuum at 120° C. for 12 hours.

Synthesis Example 16

Synthesis of COP-139

2.90 g of AlCl$_3$ and a magnetic stirring bar were added to a 30 mL glass vial, and the glass vial was then tightly sealed with a rubber septa. In order to maintain an inert medium, N$_2$ gas was made to flow into the vial. 1.00 mL of diphenyl ether and 20 ml of dried chloroform were injected into the vial, and the resulting mixture was stirred for 48 hours in an N$_2$ atmosphere (note: HCl may increase the vial pressure). After 48 hours, methanol was slowly added to quench the reaction mixture (note: the reaction between AlCl$_3$ and methanol is highly exothermic), the solids were filtered, and the residue was washed with methanol and chloroform (10 mL each) and extracted with a mixture of 100 ml of chloroform and 100 ml of methanol using a Soxhlet extractor for 24 hours. After washing, the product was dried in a vacuum at 120° C. for 12 hours.

Synthesis Example 17

Synthesis of COP-140

1.31 g of AlCl$_3$, 1.00 g of 1,3,5-triphenylbenzene and a magnetic stirring bar were added to a 30 mL glass vial and the glass vial was then tightly sealed with a rubber septa.

In order to maintain an inert medium, N$_2$ gas was made to flow into the vial. 20 ml of dried chloroform was injected into the vial and the resulting mixture was stirred for 48 hours in an N$_2$ atmosphere (note: HCl may increase the vial pressure). After 48 hours, methanol was slowly added to quench the reaction mixture (note: the reaction between AlCl$_3$ and methanol is highly exothermic), the solids were filtered, and the residue was washed with methanol and chloroform (10 mL each) and extracted with a mixture of 100 ml of chloroform and 100 ml of methanol using a Soxhlet extractor for 24 hours. After washing, the product was dried in a vacuum at 120° C. for 12 hours.

Synthesis Example 18

Synthesis of COP-141

3.15 g of AlCl$_3$ and a magnetic stirring bar were added to a 30 mL glass vial and the glass vial was then tightly sealed with a rubber septa. In order to maintain an inert medium, N$_2$ gas was made to flow into the vial. 1.00 mL of diphenyl amine and 20 ml of dried chloroform were injected into the vial, and the resulting mixture was stirred for 48 hours in an N$_2$ atmosphere (note: HCl may increase the vial pressure). After 48 hours, methanol was slowly added to quench the reaction mixture (note: the reaction between AlCl$_3$ and methanol is highly exothermic), the solids were filtered, and the residue was washed with methanol and chloroform (10 mL each) and extracted with a mixture of 100 ml of chloroform and 100 ml of methanol using a Soxhlet extractor for 24 hours. After washing, the product was dried in a vacuum at 120° C. for 12 hours.

Synthesis Example 19

Synthesis of COP-142

2.20 g of AlCl$_3$, 1.00 g of triphenylamine and a magnetic stirring bar were added to a 30 mL glass vial, and the glass vial was then tightly sealed with a rubber septa. In order to maintain an inert medium, N$_2$ gas was made to flow into the vial. 20 ml of dried chloroform was injected into the vial, and the resulting mixture was stirred for 48 hours in an N$_2$ atmosphere (note: HCl may increase the vial pressure). After 48 hours, methanol was slowly added to quench the reaction mixture (note: the reaction between AlCl$_3$ and methanol is highly exothermic), the solids were filtered, and the residue was washed with methanol and chloroform (10 mL each) and extracted with a mixture of 100 ml of chloroform and 100 ml of methanol using a Soxhlet extractor for 24 hours. After washing, the product was dried in a vacuum at 120° C. for 12 hours.

Synthesis Example 20

Synthesis of COP-143

1.40 g of AlCl$_3$ and a magnetic stirring bar were added to a 30 mL glass vial and the glass vial was then tightly sealed with a rubber septa. In order to maintain an inert medium, N$_2$ gas was made to flow into the vial. 1.00 ml of 1,2-dichlorobenzene and 20 ml of dried chloroform were injected into the vial, and the resulting mixture was stirred for 48 hours in an N$_2$ atmosphere (note: HCl may increase the vial pressure). After 48 hours, methanol was slowly added to quench the reaction mixture (note: the reaction between AlCl$_3$ and methanol is highly exothermic), the solids were filtered, and the residue was washed with methanol and chloroform (10 mL each) and extracted with a mixture of 100 ml of chloroform and 100 ml of methanol using a Soxhlet extractor for 24 hours. After washing, the product was dried in a vacuum at 120° C. for 12 hours.

Synthesis Example 21

Synthesis of COP-144

2.52 g of AlCl$_3$ and a magnetic stirring bar were added to a 30 mL glass vial and the glass vial was then tightly sealed with a rubber septa. In order to maintain an inert medium, N$_2$ gas was made to flow into the vial. 1.00 ml of toluene and 20 ml of dried 1,2-dichloroethane were injected into the vial, and the resulting mixture was stirred for 48 hours in an N$_2$ atmosphere (note: HCl may increase the vial pressure). After 48 hours, methanol was slowly added to quench the reaction mixture (note: the reaction between AlCl$_3$ and methanol is highly exothermic), the solids were filtered, and the residue was washed with methanol and chloroform (10 mL each) and extracted with a mixture of 100 ml of chloroform and 100 ml of methanol using a Soxhlet extractor for 24 hours. After washing, the product was dried in a vacuum at 120° C. for 12 hours.

Synthesis Example 22

Synthesis of COP-145

3.12 g of AlCl$_3$, 1.00 g of naphthalene and a magnetic stirring bar were added to a 30 mL glass vial and the glass vial was then tightly sealed with a rubber septa. In order to maintain an inert medium, N$_2$ gas was made to flow into the vial. 20 ml of dried 1,2-dichloroethane was injected into the vial and the resulting mixture was stirred for 48 hours in an N$_2$ atmosphere (note: HCl may increase the vial pressure). After 48 hours, methanol was slowly added to quench the reaction mixture (note: the reaction between AlCl$_3$ and methanol is highly exothermic), the solids were filtered, and the residue was washed with methanol and chloroform (10 mL each) and extracted with a mixture of 100 ml of chloroform and 100 ml of methanol using a Soxhlet extractor for 24 hours. After washing, the product was dried in a vacuum at 120° C. for 12 hours.

Synthesis Example 23

Synthesis of COP-146

2.60 g of AlCl$_3$, 1.00 g of biphenyl and a magnetic stirring bar were added to a 30 mL glass vial and the glass vial was then tightly sealed with a rubber septa. In order to maintain an inert medium, N$_2$ gas was made to flow into the vial. 20 ml of dried 1,2-dichloroethane was injected into the vial and the resulting mixture was stirred for 48 hours in an N$_2$ atmosphere (note: HCl may increase the vial pressure). After 48 hours, methanol was slowly added to quench the reaction mixture (note: the reaction between AlCl$_3$ and methanol is highly exothermic), the solids were filtered, and the residue was washed with methanol and chloroform (10 mL each) and extracted with a mixture of 100 ml of chloroform and 100 ml of methanol using a Soxhlet extractor for 24 hours. After washing, the product was dried in a vacuum at 120° C. for 12 hours.

Synthesis Example 24

Synthesis of COP-147

1.64 g of AlCl$_3$, 1.00 g of triphenylmethane and a magnetic stirring bar were added to a 30 mL glass vial and the glass vial was then tightly sealed with a rubber septa. In order to maintain an inert medium, N$_2$ gas was made to flow into the vial. 20 ml of dried 1,2-dichloroethane was injected into the vial and the resulting mixture was stirred for 48 hours in an N$_2$ atmosphere (note: HCl may increase the vial pressure). After 48 hours, methanol was slowly added to quench the reaction mixture (note: the reaction between AlCl$_3$ and methanol is highly exothermic), the solids were filtered, and the residue was washed with methanol and chloroform (10 mL each) and extracted with a mixture of 100 ml of chloroform and 100 ml of methanol using a Soxhlet extractor for 24 hours. After washing, the product was dried in a vacuum at 120° C. for 12 hours.

Synthesis Example 25

Synthesis of COP-148

0.84 g of AlCl$_3$, 0.50 g of triphenylmethane and a magnetic stirring bar were added to a 30 mL glass vial and the glass vial was then tightly sealed with a rubber septa. In order to maintain an inert medium, N$_2$ gas was made to flow into the vial. 10 ml of dried 1,2-dichloroethane was injected into the vial and the resulting mixture was stirred for 48 hours in an N$_2$ atmosphere (note: HCl may increase the vial pressure). After 48 hours, methanol was slowly added to quench the reaction mixture (note: the reaction between AlCl$_3$ and methanol is highly exothermic), the solids were filtered, and the residue was washed with methanol and chloroform (10 mL each) and extracted with a mixture of 100 ml of chloroform and 100 ml of methanol using a Soxhlet extractor for 24 hours. After washing, the product was dried in a vacuum at 120° C. for 12 hours.

Synthesis Example 26

Synthesis of COP-149

1.31 g of AlCl$_3$, 1.00 g of 1,3,5-triphenylbenzene and a magnetic stirring bar were added to a 30 mL glass vial and the glass vial was then tightly sealed with a rubber septa. In order to maintain an inert medium, N$_2$ gas was made to flow into the vial. 20 ml of dried 1,2-dichloroethane was injected into the vial and the resulting mixture was stirred for 48 hours in an N$_2$ atmosphere (note: HCl may increase the vial pressure). After 48 hours, methanol was slowly added to quench the reaction mixture (note: the reaction between AlCl$_3$ and methanol is highly exothermic), the solids were filtered, and the residue was washed with methanol and chloroform (10 mL each) and extracted with a mixture of 100 ml of chloroform and 100 ml of methanol using a Soxhlet extractor for 24 hours. After washing, the product was dried in a vacuum at 120° C. for 12 hours.

Synthesis Example 27

Synthesis of COP-150

150 g of anhydrous AlCl$_3$ was added to a 2 L beaker containing 50 ml of a benzene solution in 1L of 1,2-dichloroethane and the resulting mixture was stirred outdoors at room temperature for 40 minutes. After stirring for 40 minutes, stirring could not be conducted any further due to the formation of aggregates around the magnetic stirring bar (note: the experiment should be performed under a suitable fume hood due to the formation of HCl gas). After 18 hours, the reaction mixture was slowly quenched by the addition of a methanol ice mixture (1 L) to break up the formed aggregates (note: the water should be slowly added since the reaction between AlCl$_3$ and methanol/water is very exothermic). After quenching, the solid was filtered, dried and ground into small particles. The product was washed twice with 1.0 L of water at 80° C. for 4 hours. The product was then stirred at 60° C. for 6 hours and washed four times with 1.0 L of ethanol. The product was then stirred at 60° C. for 6 hours and washed twice with 1.0 L of CHCl$_3$. Finally, the solid was stirred at room temperature for 6 hours and washed with 1.0 L of dichloromethane. The solid was then dried in a vacuum at 120° C. to obtain 82 g of a yellow powder.

Synthesis Example 28

Synthesis of COP-151

3.15 g of AlCl$_3$ and a magnetic stirring bar were added to a 30 mL glass vial and the glass vial was then tightly sealed with a rubber septa. In order to maintain an inert medium, N$_2$ gas was made to flow into the vial. 1.00 ml of diphenylamine and 20 ml of dried 1,2-dichloroethane were injected into the vial and the resulting mixture was stirred for 48 hours in an $N_2$ atmosphere (note: HCl may increase the vial pressure). After 48 hours, methanol was slowly added to quench the reaction mixture (note: the reaction between $AlCl_3$ and methanol is highly exothermic), the solids were filtered, and the residue was washed with methanol and chloroform (10 mL each) and extracted with a mixture of 100 ml of chloroform and 100 ml of methanol using a Soxhlet extractor for 24 hours. After washing, the product was dried in a vacuum at 120° C. for 12 hours.

Synthesis Example 29

Synthesis of COP-152

0.60 g of $AlCl_3$, 0.50 g of tetraphenyladamantane and a magnetic stirring bar were added to a 30 mL glass vial and the glass vial was then tightly sealed with a rubber septa. In order to maintain an inert medium, $N_2$ gas was made to flow into the vial. 10 ml of dried 1,2-dichloroethane was injected into the vial and the resulting mixture was stirred for 48 hours in an $N_2$ atmosphere (note: HCl may increase the vial pressure). After 48 hours, methanol was slowly added to quench the reaction mixture (note: the reaction between $AlCl_3$ and methanol is highly exothermic), the solids were filtered, and the residue was washed with methanol and chloroform (10 mL each) and extracted with a mixture of 100 ml of chloroform and 100 ml of methanol using a Soxhlet extractor for 24 hours. After washing, the product was dried in a vacuum at 120° C. for 12 hours.

Example 1

Characterization of Synthesized COP

1. Structural Analysis Using Fourier-Transform Infrared Spectrum Representative structures (one of COPs linked with dichloromethane, one of COPs linked with chloroform and one of COPs linked with 1,2-dichloromethane) from each of chlorinated solvents were selected and subjected to Fourier-transform infrared spectroscopy.

Figure 2:
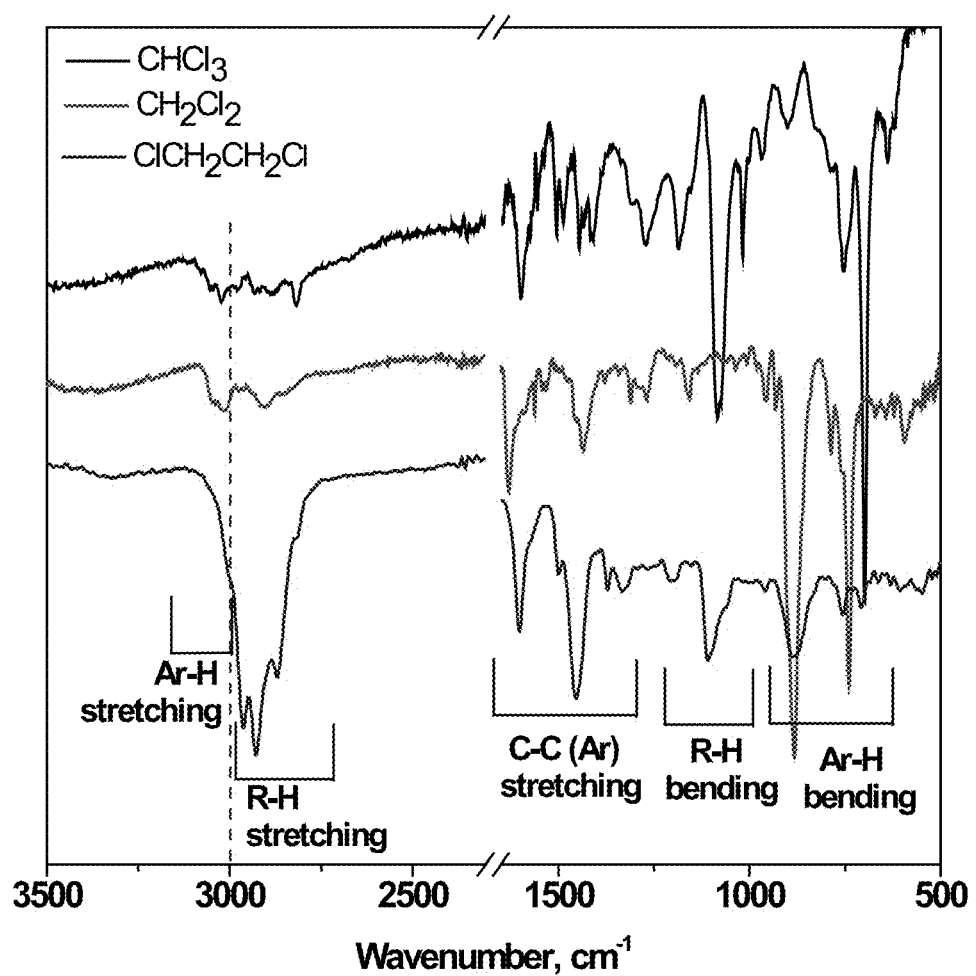
FIG. 2 shows the result of analysis of the structure of a solvent-linked covalent organic polymer through Fourier-Transform Infrared spectroscopy.

All structures have adsorptivity. As shown in FIG. 2, the structures exhibited aromatic C-H stretching vibrations at 3,000 cm$^{-1}$ or more, aliphatic C—H stretching vibrations at 2,700 to 3,000 cm$^{-1}$, aromatic C-C stretching vibrations at 1,300 to 1,600 cm$^{-1}$, aliphatic C—H bending vibrations at 1,000 to 1,250 cm$^{-1}$ and aromatic C-G bending vibrations at 600 to 900 cm$^{-1}$.

2. Structure Analysis Using NMR

Representative structures (one of COPs linked with dichloromethane, one of COPs linked with chloroform and one of COPs linked with 1,2-dichloromethane) from each of chlorinated solvents were selected and subjected to NMR.

Figure 3:
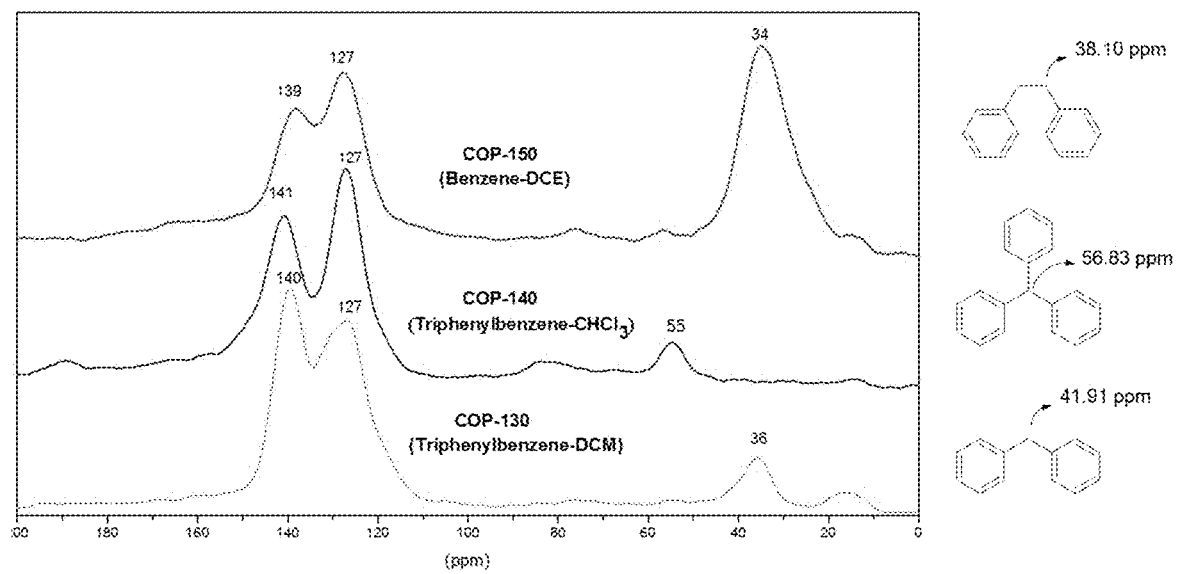
FIG. 3 shows the result of analysis of the structure of a solvent-linked covalent organic polymer through nuclear magnetic resonance spectroscopy (NMR)

As shown in FIG. 3, peaks between 20 and 60 ppm represent aliphatic carbon, peaks at about 127 ppm represent unsubstituted aromatic carbon, and peaks at about 139 to 141 ppm represent substituted aromatic carbon.

Figure 4:
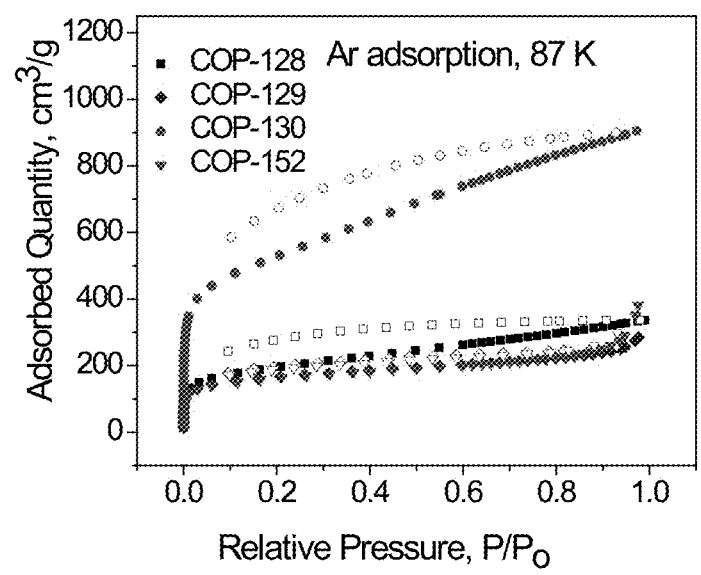
FIG. 4 shows argon adsorption and desorption isotherms of covalent organic polymers (COP 128-130 and 152) linked by dichloromethane and 1,2-dichloroethane.

3. Analysis of Surface Area, Pore Size and Pore Size Volume of COPs (124-130) Linked with Dichloromethane The COPs (124-130) were degassed in a vacuum at 120° C. for 6 hours, and the surface area was measured using Argon adsorption isotherms at 87 K. The pore size distribution was calculated using a nonlocal density functional theory (NLDFT) method and a slit pore model. The results are shown in Table 2 and in FIGS. 4 and 6. The pore size distribution was calculated using a nonlocal density functional theory (NLDFT) method and a slit pore model.

TABLE 2

| List of COPs | Monomer | Solvent linker | $SA_{BET}$ ($m^2/g$) | $SA_{Lang}$ ($m^2/g$) | $V_{tot}$ (ml/g) Total pore volume |
|---|---|---|---|---|---|
| COP-124 | Benzene | DCM | 30 | 41 | 0.17 |
| COP-125 | Triphenylmethane | DCM | 75.5 | 92 | 0.45 |
| COP-126 | Tetraphenylmethane | DCM | 48 | 60 | 0.055 |
| COP-127 | Naphthalene | DCM | 17 | 23 | 0.048 |
| COP-128 | Biphenyl | DCM | 616 | 754 | 0.41 |
| COP-129 | Tetraphenyladamantane | DCM | 531 | 605 | 0.19 |
| COP-130 | 1,3,5-triphenylbenzene | DCM | 1665 | 2033 | 0.11 |

Figure 5:
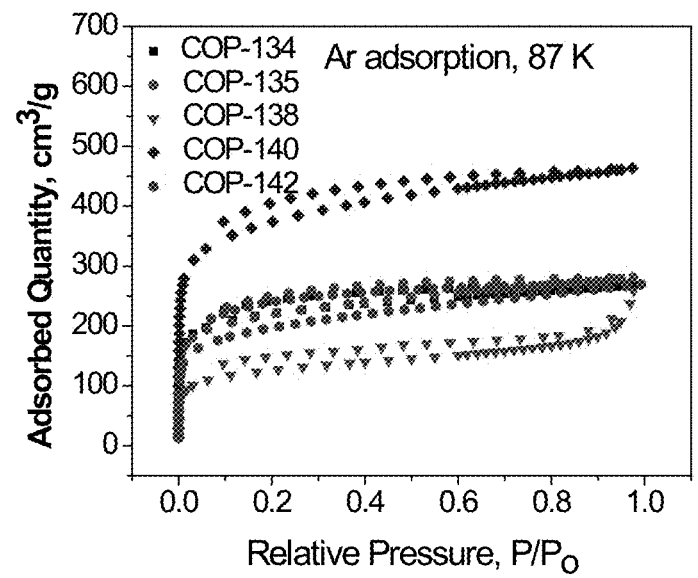
FIG. 5 shows an argon adsorption and desorption isotherm of a covalent organic polymer (COP 134-142) linked by chloroform.

4. Analysis of Surface Area, Pore Size and Pore Size Volume of COPs (131-143) linked with chloroform The COPs (131-143) were degassed in a vacuum at 120° C. for 6 hours and the surface area was measured using Argon adsorption isotherms at 87 K. The pore size distribution was calculated using a nonlocal density functional theory (NLDFT) method and a slit pore model. The results are shown in Table 3 and in FIGS. 5 and 7. The pore size distribution was calculated using a nonlocal density functional theory (NLDFT) method and a slit pore model.

TABLE 3

| List of COPs | Monomer | Solvent linker | $SA_{BET}$ ($m^2/g$) | $SA_{Lang}$ ($m^2/g$) | $V_{tot}$ (ml/g) Total pore volume |
|---|---|---|---|---|---|
| COP-131 | Benzene | $CHCl_3$ | 0 | 0 | 0 |
| COP-132 | Toluene | $CHCl_3$ | 0 | 0 | 0 |
| COP-133 | Xylene | $CHCl_3$ | 0 | 0 | 0 |
| COP-134 | Naphthalene | $CHCl_3$ | 724 | 822 | 0.35 |
| COP-135 | Biphenyl | $CHCl_3$ | 710 | 813 | 0.35 |
| COP-136 | Triphenylmethane | $CHCl_3$ | 0 | 0 | 0 |
| COP-137 | Tetraphenylmethane | $CHCl_3$ | 0 | 0 | 0 |
| COP-138 | Tetraphenyladamantane | $CHCl_3$ | 408 | 467 | 0.32 |
| COP-139 | Diphenylether | $CHCl_3$ | 0 | 0 | 0 |
| COP-140 | 1,3,5-triphenylbenzene | $CHCl_3$ | 1216 | 1302 | 0.57 |
| COP-141 | Diphenylamine | $CHCl_3$ | 0 | 0 | 0 |
| COP-142 | Triphenylamine | $CHCl_3$ | 632 | 715 | 0.33 |

TABLE 3-continued

| List of COPs | Monomer | Solvent linker | $SA_{BET}$ $(m^2/g)$ | $SA_{Lang}$ $(m^2/g)$ | $V_{tot}$ (ml/g) Total pore volume |
|---|---|---|---|---|---|
| COP-143 | Dichlorobenzene | CHCl$_3$ | 0 | 0 | 0 |

5. Analysis of Surface Area, Pore Size And Pore Size Volume of COPs (144-152) Linked with 1,2-Dichloroethane The COPs (144-152) were degassed in a vacuum at 120° C. for 6 hours and the surface area was measured using Argon adsorption isotherms at 87 K. The pore size distribution was calculated using a nonlocal density functional theory (NLDFT) method and a slit pore model. The results are shown in Table 4 below and shown in FIGS. 4 and 6.

TABLE 4

| List of COPs | Monomer | Solvent linker | $SA_{BET}$ $(m^2/g)$ | $SA_{Lang}$ $(m^2/g)$ | $V_{tot}$ (ml/g) Total pore volume |
|---|---|---|---|---|---|
| COP-144 | Toluene | DCE | 0 | 0 | 0 |
| COP-145 | Naphthalene | DCE | 0 | 0 | 0 |
| COP-146 | Biphenyl | DCE | 0 | 0 | 0 |
| COP-147 | Triphenylmethane | DCE | 0 | 0 | 0 |
| COP-148 | Tetraphenylmethane | DCE | 2.5 | — | 0.0032 |
| COP-149 | 1,3,5-Triphenylbenzene | DCE | 479 | 571 | 0.36 |
| COP-150 | Benzene | DCE | 120 | 158 | 0.061 |
| COP-151 | Diphenylamine | DCE | 0 | 0 | 0 |
| COP-152 | Tetraphenyladamantane | DCE | 523 | 600 | 0.47 |

6. Analysis of Methane Adsorption of COP-148 and COP-150

As shown in FIGS. 8 to 13, the amount of methane adsorption by COP-148 and COP-150 depending on pressure at 273 K, 278 K and 283 K was measured and was represented as a high-pressure methane adsorption isotherm. COP-148 was synthesized from tetraphenylmethane and 1,2-dichloroethane (serving as both solvent and linker) in the presence of AlC13 as a Lewis acid catalyst and COP-150 was synthesized from benzene and 1,2-dichloroethane (serving as both solvent and linker) in the presence of AlCl$_3$ as a Lewis acid catalyst.

Figure 8:
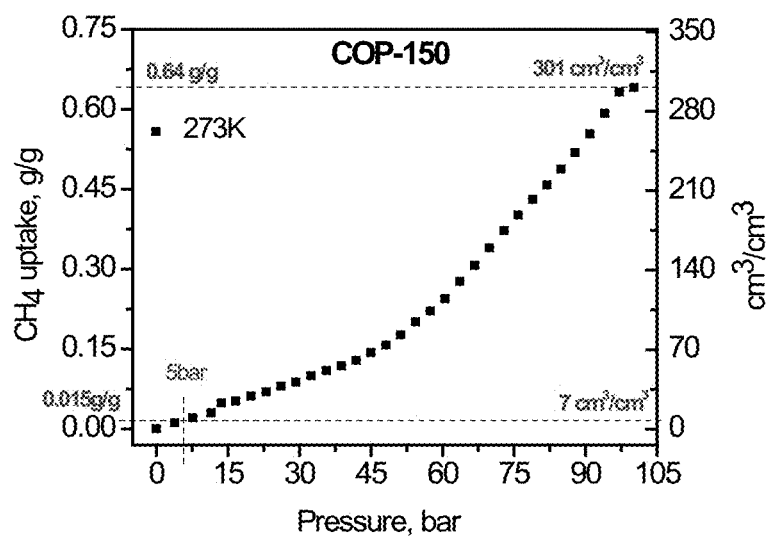
FIG. 8 shows a high-pressure methane adsorption isotherm of COP-150 at 273 K and 100 bar or less.
Figure 9:
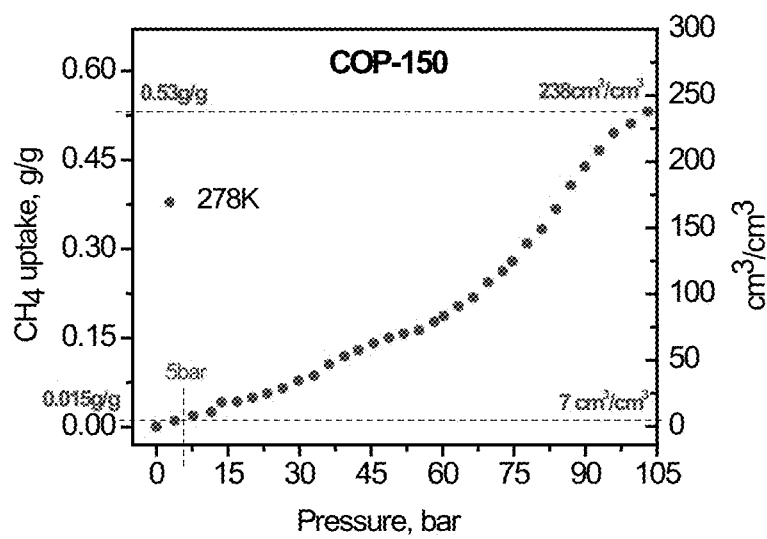
FIG. 9 shows a high-pressure methane adsorption isotherm of COP-150 at 278 K and 100 bar or less.
Figure 10:
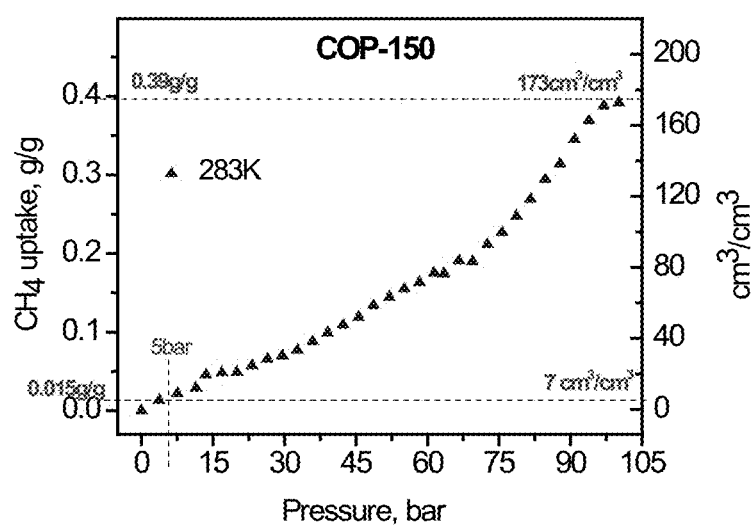
FIG. 10 shows a high-pressure methane adsorption isotherm of COP-150 at 283 K and 100 bar or less.

COP-150 had a gravimetric working capacity (at 5 to 100 bar) at 273K of 0.625 g/g, which corresponds to 98% of the total capacity (0.64 g/g) (FIG. 8). This is 25% higher than the target set by the United States Department of Energy (DOE). COP-150 also had a volumetric working capacity (at 5 to 100 bar) at 273K of 294 cm$^3$/cm$^3$, based on the bulk tap density of 0.337 g/ml, which is 12% higher than the target set by the DOE.

Figure 11:
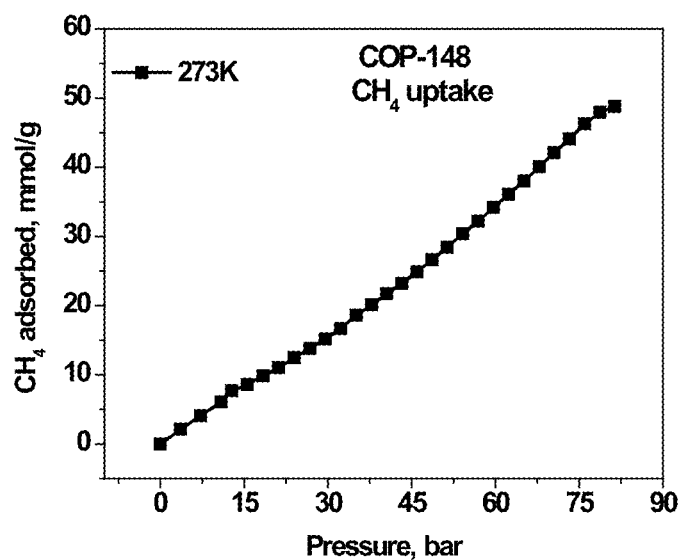
FIG. 11 shows a high-pressure methane adsorption isotherm of COP-148 at 273 K and 100 bar or less.
Figure 12:
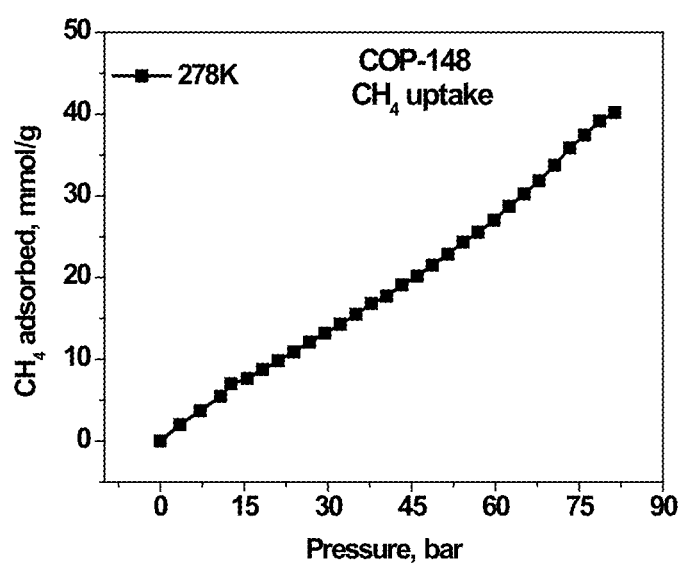
FIG. 12 shows a high-pressure methane adsorption isotherm of COP-148 at 278 K and 100 bar or less.
Figure 13:
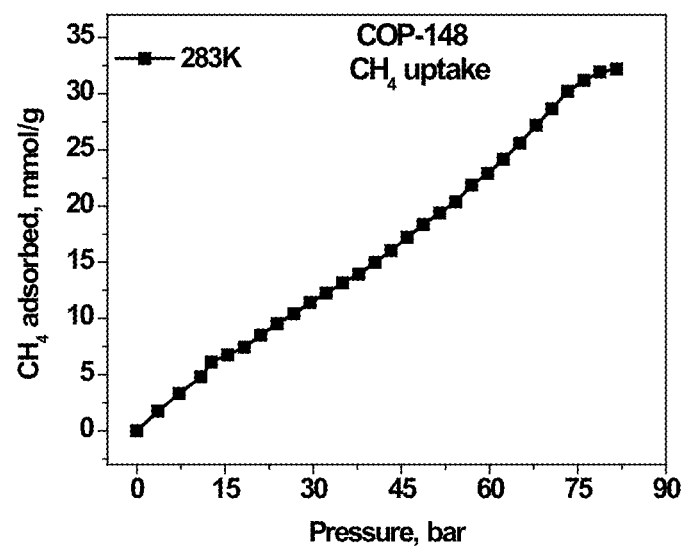
FIG. 13 shows a high-pressure methane adsorption isotherm of COP-148 at 283 K and 100 bar or less.

COP-148 had a gravimetric operating capacity (5 to 80 bar) at 273 K of 0.762 g/g, which corresponds to 96% of the total capacity (0.79 g/g) (FIG. 11). COP-148 has capacity much larger than COP-150 and 52% higher than the DOE target, although it has a nonporous structure.

The high-pressure methane adsorption isotherms of COP-150 and COP-148, respectively (FIGS. 9, 10, 12 and 13) had similar behaviors at 278K and 283K as at 273K.

This demonstrates that the covalent organic polymer of the present invention is suitable for the transportation and storage of natural gas.

Although specific configurations of the present invention have been described in detail, those skilled in the art will appreciate that this description is provided to set forth preferred embodiments for illustrative purposes and should not be construed as limiting the scope of the present invention. Therefore, the substantial scope of the present invention is defined by the accompanying claims and equivalents thereto.

INDUSTRIAL APPLICABILITY

The porous covalent organic polymer according to the present invention can be utilized in a variety of applications as an adsorbent of natural gas because it is suitable for transporting and storing natural gas due to elasticity (flexibility) and very high storage capacity. In addition, the method of preparing a porous covalent organic polymer is capable of preparing a porous covalent organic polymer at room temperature and atmospheric pressure through simple and fast one-pot polymerization without the necessity for a heating or purification step. The method is carried out using Lewis acid catalysts, aromatic monomers and chlorinated solvents, which are readily available and inexpensive, thus facilitating reduced production costs and industrial mass production.

What is claimed is:

1. A flexible porous covalent organic polymer represented by Formula 1, 2 or 3, which has a specific surface area of 10 to 2,500 m$^2$/g and pore size of more than 0 and 40 nm or less and is present as a combination of microporous, mesoporous and microporous structures:

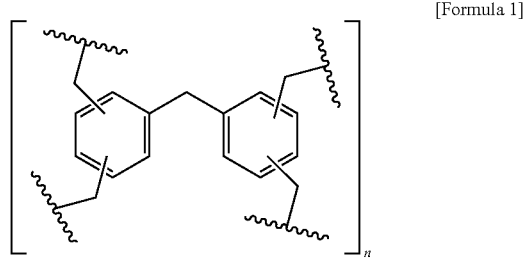

[Formula 1]

wherein n is an integer of 10 to 100,000 and

is the position where monomer repeats;

[Formula 2]

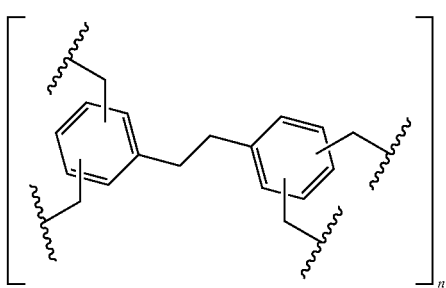

wherein n is an integer of 10 to 100,000 and

is the position where monomer repeats; and

[Formula 3]

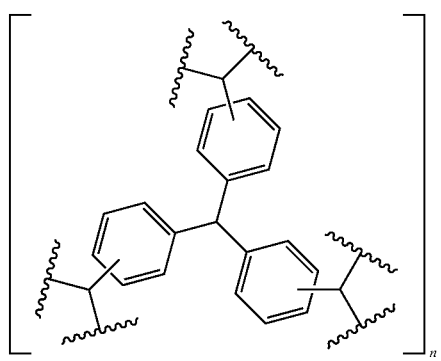

wherein n is an integer of 10 to 100,000 and

is the position where monomer repeats.

2. A method of preparing a porous covalent organic polymer comprising preparing the porous covalent organic polymer represented by Formula 1, 2 or 3 by adding an aromatic monomer and a chlorinated solvent in presence of a Lewis acid catalyst and performing a Friedel-Crafts alkylation polymerization reaction:

[Formula 1]

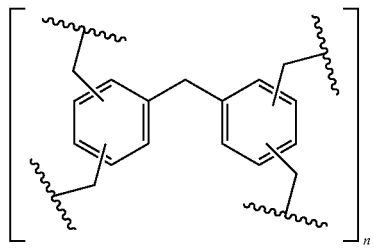

wherein n is an integer of 10 to 100,000 and

is the position where monomer repeats;

[Formula 2]

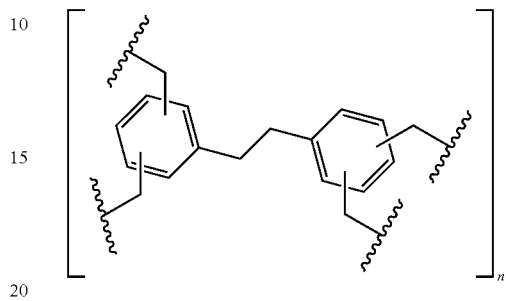

wherein n is an integer of 10 to 100,000 and

is the position where monomer repeats; and

[Formula 3]

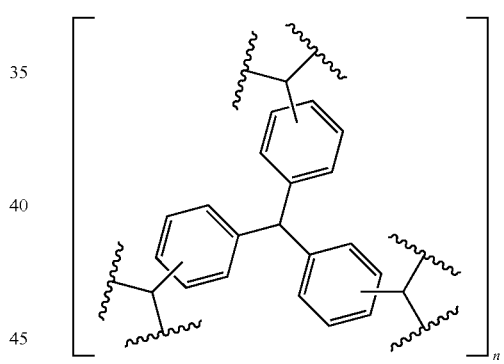

wherein n is an integer of 10 to 100,000 and is the position where monomer repeats.

3. The method of preparing a porous covalent organic polymer of claim 2, wherein the chlorinated solvent is added in an amount of 500 to 20,000 parts by weight with respect to 100 parts by weight of the aromatic monomer.

4. The method of preparing a porous covalent organic polymer of claim 2, wherein the Lewis acid catalyst is aluminum chloride ($AlCl_3$).

5. The method of preparing a porous covalent organic polymer of claim 2, wherein the aromatic monomer is one or more selected from the group consisting of benzene, toluene, xylene, mesitylene, phenol, aniline, pyridine, 1,2-dichlorobenzene, triphenylamine, triphenylphosphine, naphthalene, biphenyl, triphenylmethane, tetraphenylmethane, tetraphenyladamantane, diphenyl ether, triphenylbenzene, triphenylmethane and diphenylamine.

6. The method of preparing a porous covalent organic polymer of claim 2, wherein the chlorinated solvent is dichloromethane, chloroform or 1,2- dichloroethane.

7. The method of preparing a porous covalent organic polymer of claim 2, wherein the chlorinated solvent is a linker connecting the aromatic monomers.

8. The method of preparing a porous covalent organic polymer of claim 2, wherein the reaction is carried out in presence of inert gas at −25 to 125° C. for 24 to 72 hours.

9. The method of preparing a porous covalent organic polymer of claim 2, wherein the reaction is one-pot polymerization.

10. A natural gas adsorbent comprising the porous covalent organic polymer of claim 1.

\* \* \* \* \*

UNITED STATES PATENT AND TRADEMARK OFFICE
CERTIFICATE OF CORRECTION

| | | |
|---|---|---|
| PATENT NO. | : 11,535,701 B2 | Page 1 of 1 |
| APPLICATION NO. | : 16/808642 | |
| DATED | : December 27, 2022 | |
| INVENTOR(S) | : Cafer Yavuz et al. | |

It is certified that error appears in the above-identified patent and that said Letters Patent is hereby corrected as shown below:

In the Specification

Column 1, Line 17 "(COPS)" should be -- COPs --.

Signed and Sealed this
Twenty-first Day of February, 2023

*Katherine Kelly Vidal*

Katherine Kelly Vidal
*Director of the United States Patent and Trademark Office*